May 14, 1968 R. C. POSH 3,383,135
RECLINING SEAT ASSEMBLY
Filed April 5, 1966
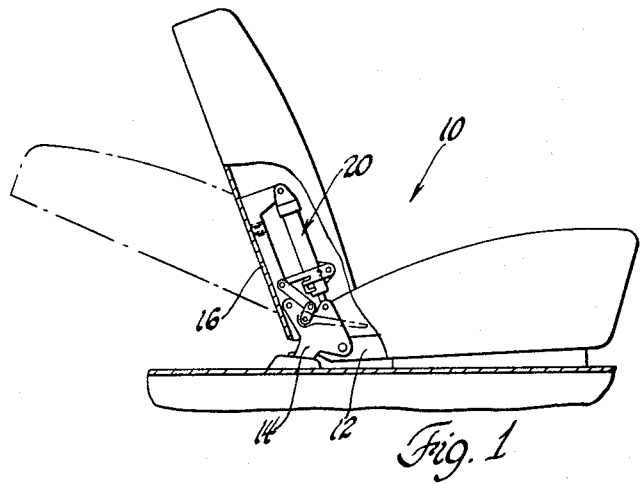
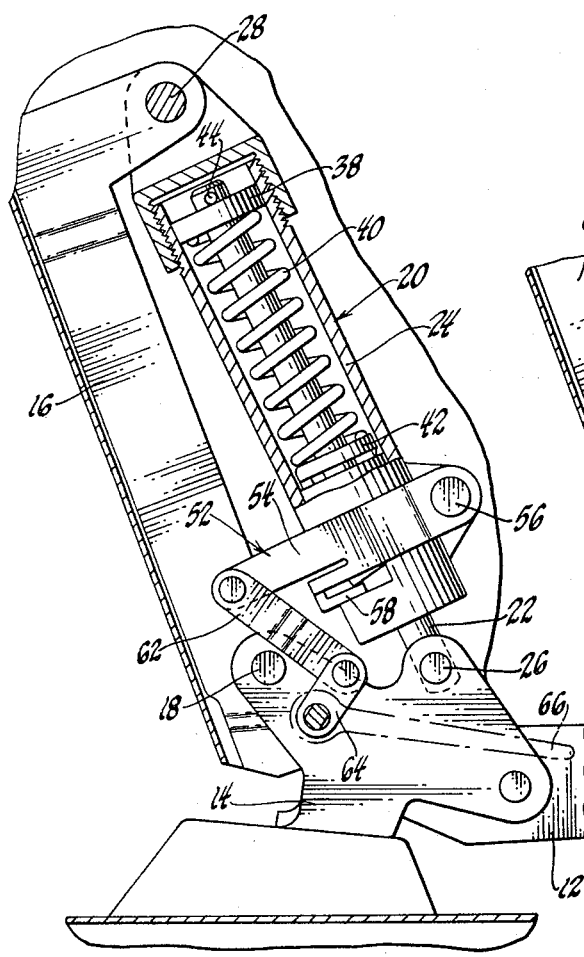
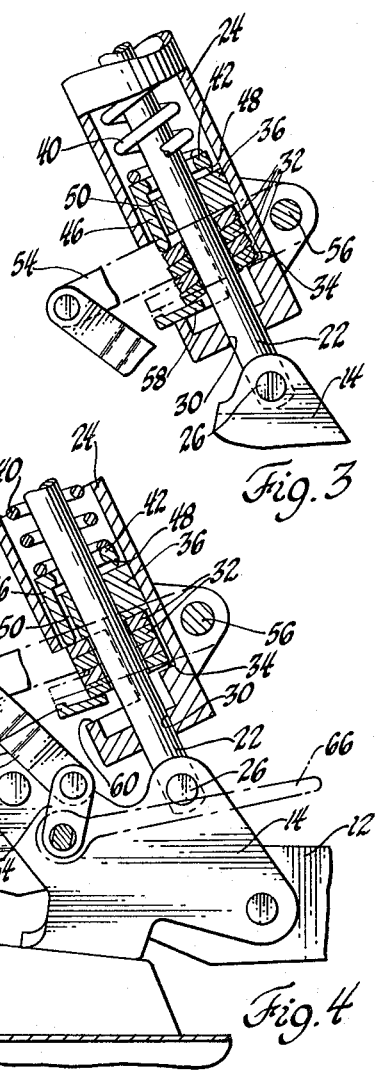
INVENTOR.
Raymond C. Posh
BY
Barnard, McGlynn & Reising
ATTORNEYS United States Patent Office 3,383,135
Patented May 14, 1968

3,383,135
RECLINING SEAT ASSEMBLY
Raymond C. Posh, Livonia, Mich., assignor, by mesne assignments, to Lear Siegler, Inc., Santa Monica, Calif., a corporation of Delaware
Filed Apr. 5, 1966, Ser. No. 540,299
20 Claims. (Cl. 297—355)

ABSTRACT OF THE DISCLOSURE

A reclining seat assembly including a seat back frame pivotally connected to a seat frame for movement between an upright position and various reclined positions and a positioning mechanism for controlling the pivotal movement of the seat back frame relative to the seat frame, which mechanism includes first and second members operatively interconnected by a friction means which is biased into frictional engagement with the first member, for preventing relative movement between the members by a biasing means which also urges relative movement between the members in a first direction.

Seat assemblies heretofore known have utilized various positioning mechanisms for controlling the reclined position of a seat back frame. Normally, such mechanisms are manually actuated or operated to allow relative pivotal movement between the seat back frame and the seat frame. In addition, in some environments it is necessary that such a positioning mechanism allow the seat back frame to be pivoted from a reclined position toward the upright position as a force is applied to the seat back frame without requiring the manual actuation of the mechanism.

Typical of such positioning mechanisms for controlling the reclined position of a seat back frame is one including a rod slidably disposed in a housing with a pair of spaced packs of discs disposed about the rod for frictionally engaging the rod to prevent relative movement between the rod and the housing with a first spring disposed between the disc packs and a second spring disposed between one end of the rod and a portion of the housing for urging the rod to move into the housing. The two spaced packs of discs are separated and urged apart by the first spring and the first spring also biases the respective disc packs into an inclined position relative to the longitudinal axis of the rod so that the disc packs frictionally engage the rod to prevent relative movement between the rod and the housing in both directions. Such a mechanism normally includes a manually actuable control means for selectively moving one or both of the disc packs from frictional engagement with the rod to allow relative movement between the rod and the housing. One of the problems associated with such a mechanism is that the first spring, which is disposed between the two disc packs, must be balanced with the second spring, which urges the rod into the housing, so that the first spring applies a large enough force on the disc packs to establish a sufficient frictional binding engagement between the disc packs and the rod to prevent movement of the rod into the housing under the biasing action of the second spring. On the other hand, the force applied by the first spring must not be sufficient to prevent the disc packs from being moved out of frictional engagement with the rod by a reasonable force applied to the manually actuable control means to allow the second spring to move the rod into the housing Frequently, the first spring, which urges the disc into frictional engagement with the rod, applies a sufficient force on the disc packs to prevent relative movement between the rod and the housing when the mechanism is new, but after a period of repeated use the edges of the individual discs wear and more force on the disc packs is required to maintain the disc packs in sufficient frictional engagement with the rod to prevent relative movement between the rod and the housing. When the individual discs have worn sufficiently, the second spring may be strong enough to move the rod into the housing without movement of the disc packs because the first spring does not apply sufficient force to the disc packs to maintain the disc packs in sufficient binding frictional contact with the rod to prevent relative movement between the rod and the housing.

Accordingly, it is an object and feature of the instant invention to provide a positioning mechanism for a reclining seat assembly wherein a single spring may be utilized to urge at least one disc into frictional binding engagement with the rod and is also utilized to urge the rod to move into the housing, thus eliminating, among other problems, the problem of balancing the forces applied by the two separate springs to compensate for wear in the prior art mechanisms.

Another object and feature of the instant invention is to provide a reclining seat assembly including a positioning mechanism which utilizes a single spring means to bias at least one disc into binding frictional engagement with a rod to prevent relative movement between the rod and a housing and which may be manually actuated so that the seat back will automatically return to the upright position under the biasing action of the single spring means.

A further object and feature of this invention is to provide a reclining seat assembly including a positioning mechanism for controlling the position of the seat back and which utilizes at least one disc biased into binding frictional engagement with a rod by a single spring means and which may be manually actuated to pivot the seat back in either direction and which will allow the seat back frame to pivot toward the upright position without manual actuation of the mechanism when a predetermined force is applied to the seat back frame.

In general, these and other objects and features of this invention may be attained in a preferred embodiment which includes a housing pivotally connected at one end to a seat back frame and a rod pivotally connected at one end to a seat frame and slidably disposed in the housing. A plurality of discs are disposed about the rod and are retained in the housing for movement to and from an inclined position of binding frictional engagement with the rod to prevent relative movement between the rod and the housing in both directions. A retaining means is disposed on the end of the rod disposed within the housing and a spring is disposed about the rod and reacts between the retaining means and the discs to urge the discs into frictional engagement with the rod. A manually actuatable control means is disposed on the housing and has a flange for engaging the discs to move the discs out of frictional engagement with the rod to allow relative movement in either direction between the housing and the rod so that the position of the seat back frame may be adjusted. When the manually actuatable control means moves the discs out of frictional engagement with the rod, the spring urges the rod to move into the housing by reacting with the housing through the discs so that the seat back frame will automatically pivot from a reclined position toward the upright position under the force of the spring when an insufficient force is applied to urge the seat back frame toward a reclined position. In addition, a force may be applied to the seat back frame to urge the seat back frame to pivot toward the upright position and the housing will engage the discs to move the discs out of frictional engagement with the rod to allow the seat back frame to pivot toward the upright position.

Other objects and attendant advantages of the present invention will be readily appreciated as the same becomes better understood by reference to the following detailed description when considered in connection with the accompanying drawings wherein:

FIGURE 1 is a side elevational view partially broken away of a preferred embodiment of the instant invention;

FIGURE 2 is an enlarged fragmentary view partially broken away and in cross section of the preferred embodiment illustrated in FIGURE 1;

FIGURE 3 is a fragmentary cross-sectional view showing the mechanism in the locked position; and FIGURE 4 is a fragmentary cross-sectional view showing the positioning mechanism in the manually released position.

Referring now to the drawings, wherein like numerals indicate like or corresponding parts throughout the several views, a reclining seat assembly constructed in accordance with the instant invention is generally shown at 10 in FIGURE 1.

The seat assembly includes a seat frame 12, an intermediate frame 14, and a seat back frame 16. The seat back frame 16 is pivotally connected through the pins 18 to the intermediate frame 14. The intermediate frame 14 is connected to the seat frame 12; hence, the seat back frame 16 is also operatively and pivotally connected to the seat frame 12 so that the seat back frame 16 may be positioned in the upright position illustrated in solid lines in FIGURE 1 or in any one of various reclined positions, one of which is shown in phantom in FIGURE 1.

A positioning mechanism, generally indicated at 20, controls the pivotal movement of the seat back frame 16 relative to the seat frame 12 and includes a first member, the rod 22, and a second member, the housing 24. The rod 22 is pivotally connected by the pin 26 to the intermediate frame 14 and the housing 24 is pivotally connected by the pin 28 to the seat back frame 16. The rod 22 is slidably disposed in the housing as indicated at 30; thus, the rod 22 and housing 24 are adapted for sliding movement relative to one another.

A friction means comprising the discs 32 are disposed within the housing 24 and the rod 22 passes through each of the discs 32. The discs 32 are retained in the housing 24 by a shoulder 34 and a spacer member 36 which is secured in the housing 24.

There is also included a biasing means comprising the retaining means 38, the spring 40, and the washer-like element 42. The retaining means 38 comprises a washer retained on the rod 22 by a pin 44. The washer-like element 42 has an arm 46 extending downwardly to engage the discs 32 and a projection 48 to engage the spacer 36. The spacer 36 has a slot 50 therein through which the arm 46 extends.

A manually actuatable control means is included and is generally indicated at 52. The control means 52 includes a lever 54 which is pivotally mounted by the pin 56 on the housing 24. A flange 58 extends from the lever 54 and through an opening 60 in the housing to engage the lower side of the discs 32 upon pivotal movement of the lever 54. The lever 54 is connected through the links 62 and 64 to the handle 66 so that upon movement of the handle 66, the flange 58 engages the discs 32.

The discs 32 operatively engage the housing 24 on one side of the rod 22 by being retained in the recess formed between the shoulder 34 and the spacer 36 and engage the arm 46 on the opposite side of the rod 22. The discs 32 are inclined relative to the longitudinal axis of the rod 22 under the biasing action of the spring 40 as transmitted through the arm 46, as shown in FIGURE 3. When the discs 32 are in the inclined position, they are in binding frictional engagement with the rod 22 to prevent relative movement between the rod 22 and the housing 24. That is to say, when the discs 32 are in the inclined position illustrated in FIGURE 3, the rod 22 is prevented from moving into or out of the housing 24.

To manually actuate the positioning mechanism for changing the pivotal position of the seat back frame 16 relative to the seat frame 12, the handle 66 is rotated to engage the flange 58 with the discs 32 on the side of the rod 22 opposite to the engagement between the discs 32 and the housing 24 to move the discs 32 out of frictional contact with the rod 22, which position is illustrated in FIGURE 4. When the discs 32 have been moved to the position illustrated in FIGURE 4, the seat back frame 16 may be pivoted either toward or away from the upright position. However, if no force is applied to the seat back frame 16 to urge it toward a reclining position when the discs are in the position illustrated in FIGURE 4, the force of the spring 40 acting against the shoulder 34 through the arm 46 and the discs 32 urges the rod 22 to slide into the housing 24 and automatically moves the seat back frame 16 toward the upright position. It will be noted that the extension 48 on the washer-like member 42 engages the spacer 36 so that the spring 40 also transmits a force through the spacer 36 to the housing 24; however, the washer-like member 42 need not be in contact with the housing 24 through the projection 48 in order to urge the rod 22 into the housing 24.

When the seat back frame 16 is reclined and locked in position by frictional engagement between the discs 32 and the rod 22, the seat back frame 16 may be moved toward the upright position without manually rotating the lever 66. This may be accomplished by applying a predetermined force to the seat back frame 16 to urge the seat back frame 16 to pivot relative to the seat frame 12 toward the upright position. When such a predetermined force is applied, the housing 24 acts against the discs 32 through the spacer 36 to move the discs 32 out of frictional engagement with the rod 22, which in turn allows the rod 22 to move into the housing 24 until the force is removed at which time the disc 32 will return to frictional engagement with the rod 22 by action of the spring 40. Thus, the spring 40, acting through the washer-like member 42 and the arm 46, allows the discs 32 to be moved out of frictional engagement with the rod 22 when a predetermined force is applied to the seat back frame 16 to urge it toward the upright position. It is to be understood that the inclination of the discs 32 need not be to the degree illustrated in FIGURE 3 and only a slight movement of the control discs by the housing 24 is necessary to release the rod 22 for movement into the housing 24.

The instant invention, therefore, provides a very simplified mechanism for selectively controlling the reclined position of a seat. The mechanism utilizes one spring 40 which urges the disc 32 into frictional engagement with the rod 22 to prevent relative movement between the rod 22 and the housing 24 yet allows the seat back frame 16 to be pivoted toward the upright position by applying a predetermined force to the seat back frame 16 without manually actuating the handle 66. In addition, the spring 40 urges the rod 22 to move into the housing 24 and when the handle 66 is rotated to move the flange 58, which in turn moves the disc 32 out of frictional engagement with the rod 22, the seat back frame 16 will automatically pivot toward the upright position under the force applied by the spring 40.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A reclining seat assembly comprising: a seat frame, a seat back frame, means pivotally connecting said seat back frame to said seat frame to allow said seat back frame to be pivoted between an upright position and any one of various reclined positions, a positioning mechanism for controlling the pivotal movement of said seat back frame relative to said seat frame and including first and second members adapted for movement relative to one another, one of said members being pivotally connected to said seat back frame and the other member being operatively and pivotally connected to said seat frame, friction means operatively engaging said first member and having a first position in frictional engagement with said second member for preventing relative movement between said members and being movable from said first position to allow relative movement between said members, and biasing means operatively connected to said second member and reacting against said friction means for urging said friction means into said first position to prevent pivotal movement of said seat back frame and for allowing said friction means to move from said first position to allow said members to move relative to one another in a first direction when a predetermined force is applied to urge said seat back frame toward said upright position.

2. An assembly as set forth in claim 1 including actuatable control means mounted on one of said members and engageable with said friction means for selectively moving said friction means from said first position so that said seat back frame may be pivoted in either direction to adjust the position thereof and for allowing said biasing means to pivot said seat back frame from a reclined position toward said upright position.

3. An assembly as set forth in claim 1 wherein said friction means include a plurality of discs and said second member comprises a rod which passes through said discs, said discs being in operative engagement with said second member on one side of said rod and in operative engagement with said biasing means on the opposite side of said rod so that said discs are inclined relative to the longitudinal axis of said rod when in said first position.

4. An assembly as set forth in claim 3 wherein said engagement between said first member and said discs restricts movement of said discs relative to said first member so that said first member moves said discs from said first position when said members are urged to move relative to one another in response to said predetermined force, thereby allowing said members to move relative to one another in said first direction until said force is removed whereby said discs return to said first position.

5. An assembly as set forth in claim 4 including actuatable control means mounted on said first member and engageable with said discs to selectively move said discs from said first position whereby said rod may be moved relative to said first member in said first direction and in the opposite direction.

6. An assembly as set forth in claim 4 wherein said first member includes a housing, said rod being slidably disposed in said housing with a first end thereof extending from said housing, and a retaining means disposed on the second end of said rod, said biasing means comprising at least one spring disposed about said rod and reacting between said retaining means and said discs.

7. An assembly as set forth in claim 6 including a washer-like element disposed about said rod and engaging said spring, and an arm extending from said washer-like element and engaging said discs on said other side of said rod.

8. An assembly as set forth in claim 7 wherein said washer-like element engages said housing on the side of said rod opposite to said arm.

9. An assembly as set forth in claim 8 comprising actuatable control means including a lever member pivotally connected to said housing, said housing having an opening therein on said other side of said rod, and a flange extending from said lever member and into said housing through said opening for selectively engaging said discs to move said discs from said first position to allow said rod to move into the out of said housing.

10. A positioning mechanism comprising: first and second members adapted for movement relative to one another, friction means operatively engaging said first member and being movable to a first position in frictional engagement with said second member for preventing relative movement between said members and to a second position for allowing relative movement between said members, and biasing means operatively connected to said second member and reacting with said friction means for urging said friction means into said first position and for allowing said friction means to move to said second position to allow said members to move relative to one another in a first direction in response to a predetermined force applied to said members.

11. A positioning mechanism as set forth in claim 10 including actuatable control means mounted on one of said members and engageable with said friction means to selectively move said friction means to said second position whereby said members may be moved relative to one another in said first direction and in the opposite direction.

12. A mechanism as set forth in claim 10 wherein said biasing means reacts with said second member to urge relative movement between said members in said first direction.

13. A mechanism as set forth in claim 10 wherein said friction means includes a plurality of discs.

14. A mechanism as set forth in claim 13 wherein said second member comprises a rod which passes through said discs, said discs being in operative engagement with said first member on one side of said rod and in operative engagement with said biasing means on the opposite side of said rod so that said discs are inclined relative to the longitudinal axis of said rod when in said first position.

15. A mechanism as set forth in claim 14 wherein said engagement between said first member and said discs restricts movement of said discs relative to said first member so that said first means engages said discs to move said discs from said first position when said members are urged to move relative to one another in response to said predetermined force, thereby allowing said members to move relative to one another in said first direction until said force is removed whereby said discs return to said first position.

16. A mechanism as set forth in claim 15 including actuatable control means mounted on said first member and engageable with said discs to selectively move said discs to said second position whereby said rod may be moved relative to said first member in said first direction and in the opposite direction.

17. A mechanism as set forth in claim 15 wherein said first member includes a housing, said rod being slidably disposed in said housing with a first end thereof extending from said housing, and a retaining means disposed on the second end of said rod, said biasing means comprising at least one spring disposed about said rod and reacting between said retaining means and said discs.

18. A mechanism as set forth in claim 17 including a washer-like element disposed about said rod and engaging said spring, and an arm extending from said washer-like element and engaging said discs on said other side of said rod.

19. A mechanism as set forth in claim 18 wherein said washer-like element engages said housing on the side of said rod opposite to said arm.

20. A mechanism as set forth in claim 19 comprising actuatable control means including a lever member pivotally connected to said housing, said housing having an opening therein on said other side of said rod, and a flange extending from said lever member and into said housing through said opening for selectively engaging said discs to move said discs to said second position to allow said rod to move into and out of said housing.

References Cited

UNITED STATES PATENTS 2,579,305    12/1951    Cushman _____ 297—375 X
2,750,994    6/1956    Howell _____ 297—375

BOBBY R. GAY, *Primary Examiner.*

G. O. FINCH, *Assistant Examiner.*